(12) United States Patent
Shattuck et al.

(10) Patent No.: US 9,964,162 B2
(45) Date of Patent: *May 8, 2018

(54) DEVICE AND METHOD FOR CONTROLLING TRANSMISSION TORQUE TO PROVIDE HILL ASCENT AND/OR DESCENT ASSISTANCE

(71) Applicant: Allison Transmission, Inc., Indianapolis, IN (US)

(72) Inventors: Jared S. Shattuck, Indianapolis, IN (US); Jeffrey E. Shultz, Zionsville, IN (US); Peter G. York, Carmel, IN (US)

(73) Assignee: Allison Transmission, Inc., Indianapolis, IN (US)

( * ) Notice: Subject to any disclaimer, the term of this patent is extended or adjusted under 35 U.S.C. 154(b) by 90 days.

This patent is subject to a terminal disclaimer.

(21) Appl. No.: 13/835,265

(22) Filed: Mar. 15, 2013

(65) Prior Publication Data

US 2013/0304339 A1    Nov. 14, 2013

Related U.S. Application Data

(60) Provisional application No. 61/611,952, filed on Mar. 16, 2012.

(51) Int. Cl.
*G06F 7/00* (2006.01)
*G06F 17/00* (2006.01)
(Continued)

(52) U.S. Cl.
CPC .......... *F16D 48/06* (2013.01); *F16H 61/0059* (2013.01); *F16H 61/20* (2013.01); *F16H 2061/205* (2013.01)

(58) Field of Classification Search
CPC ........ F16D 48/06; F16D 48/00; B60W 10/02; B60W 10/06; B60W 10/115; B60W 30/18;
(Continued)

(56) References Cited

U.S. PATENT DOCUMENTS 4,644,826 A     2/1987  Kubo et al.
4,757,886 A *   7/1988  Brown ................. B60W 30/18
                                                          192/103 F
(Continued)

FOREIGN PATENT DOCUMENTS

CN    101004215 A    7/2007
CN    101326389 A    12/2008
(Continued)

OTHER PUBLICATIONS

U.S. Appl. No. 13/835,331, filed Mar. 15, 2013, 56 pages.
(Continued)

*Primary Examiner* — Behrang Badii
*Assistant Examiner* — Daniel L Greene
(74) *Attorney, Agent, or Firm* — Barnes & Thornburg LLP

(57) ABSTRACT

A device, system, and method for controlling transmission torque to provide hill ascent and/or descent assistance to a vehicle includes applying a clutch hold pressure to one or more clutches of a transmission to lock an output shaft of the transmission to resist roll-back of the vehicle. The clutch hold pressure is applied based on one or more of a transmission output speed signal, an engine throttle signal, and a vehicle brake signal.

26 Claims, 4 Drawing Sheets

(51) Int. Cl.
*G06F 19/00* (2011.01)
*F16D 48/06* (2006.01)
*F16H 61/00* (2006.01)
*F16H 61/20* (2006.01)

(58) Field of Classification Search
CPC ........... B60W 30/18045; B60W 10/10; B60W 30/1819; F16H 61/143; F16H 61/0059; F16H 61/20; F16H 2061/205; F16H 61/14; F16H 59/02; F16H 1/0009; F16H 59/40; F16H 61/66; F16H 61/662; F16H 61/0246; F16H 61/0206; F16H 61/061; F16H 59/42; F16H 63/46; F16H 2059/088; F16H 2059/385
USPC ........................................................ 701/68
See application file for complete search history.

(56) References Cited

U.S. PATENT DOCUMENTS

| | | | | |
|---|---|---|---|---|
| 4,854,194 A * | 8/1989 | Kaneko | .............. | F16H 61/0213 477/900 |
| 5,029,494 A * | 7/1991 | Lentz | ................... | F16H 61/061 477/148 |
| 5,040,648 A * | 8/1991 | Mitchell | .............. | B60W 10/02 192/13 R |
| 5,046,174 A * | 9/1991 | Lentz | ................... | F16H 61/061 477/144 |
| 5,137,127 A | 8/1992 | Braun | | |
| 5,305,663 A * | 4/1994 | Leonard | ............. | F16H 61/0009 475/123 |
| 5,343,782 A * | 9/1994 | Jamzadeh | ............ | F16H 61/061 477/156 |
| 5,417,621 A * | 5/1995 | Tibbles | ................ | B60W 10/02 477/39 |
| 5,456,333 A * | 10/1995 | Brandt | .................. | B60W 10/02 180/336 |
| 5,474,164 A * | 12/1995 | Berger | .................. | B60K 17/26 192/219.2 |
| 5,474,168 A | 12/1995 | Leslie et al. | | |
| 5,630,772 A | 5/1997 | Tsukamoto et al. | | |
| 5,693,878 A * | 12/1997 | Giles | .................. | G01M 13/022 340/453 |
| 5,813,943 A | 9/1998 | Kousaka et al. | | |
| 5,911,646 A * | 6/1999 | Tsutsui et al. | .................. | 477/93 |
| 6,272,415 B1 | 8/2001 | Tanaka et al. | | |
| 6,308,125 B1 * | 10/2001 | Gleason | ............... | B60W 10/06 701/53 |
| 6,319,172 B1 * | 11/2001 | Steinmetz | ............ | F16H 61/061 192/48.601 |
| 6,656,087 B1 * | 12/2003 | Runde | .................. | B60W 10/06 477/107 |
| 6,679,810 B1 | 1/2004 | Boll et al. | | |
| 7,590,480 B2 * | 9/2009 | Dlugoss | ................ | F16H 61/061 701/51 |
| 2002/0117338 A1 | 8/2002 | Itou | | |
| 2003/0029657 A1 * | 2/2003 | Darnell | ......................... | 180/170 |
| 2003/0233186 A1 | 12/2003 | Chess | | |
| 2005/0064988 A1 | 3/2005 | Hasegawa et al. | | |
| 2005/0075775 A1 | 4/2005 | Carlson et al. | | |
| 2006/0160659 A1 | 7/2006 | Jlang et al. | | |
| 2007/0010927 A1 * | 1/2007 | Rowley | ................. | B60W 10/02 701/51 |
| 2007/0168103 A1 | 7/2007 | Scelers | | |
| 2009/0118949 A1 * | 5/2009 | Heap | ...................... | B60K 6/445 701/55 |
| 2010/0250076 A1 | 9/2010 | Shultz et al. | | |
| 2010/0305822 A1 | 12/2010 | Kresse et al. | | |
| 2011/0166756 A1 | 7/2011 | Marcus | | |
| 2011/0218699 A1 | 9/2011 | Petzold | | |
| 2012/0010044 A1 * | 1/2012 | Gibson | ............... | B60W 10/023 477/52 |
| 2012/0010045 A1 * | 1/2012 | Nedorezov | ......... | F02N 11/0814 477/79 |
| 2012/0220424 A1 | 8/2012 | Staudinger et al. | | |

FOREIGN PATENT DOCUMENTS

| | | |
|---|---|---|
| CN | 102177372 A | 9/2011 |
| CN | 102192312 A | 9/2011 |
| DE | 10320775 A1 | 12/2004 |
| EP | 0751325 A2 | 1/1997 |
| EP | 1995499 A1 | 11/2008 |
| JP | 7019337 A | 1/1995 |

OTHER PUBLICATIONS

International Search Report and Written Opinion received for International Patent Application No. PCT/US2013/031926, mailed May 31, 2013, 6 pages.
International Search Report and Written Opinion received for International Patent Application No. PCT/US2013/031929, dated May 24, 2013, 15 pages.
Office Action from the State Intellectual Property Office for the Peoples Republic of China for Application No. 201380025547.0, dated Dec. 2, 2015, 18 pages.
First Office Action from the State Intellectual Property Office of the People's Republic of China for Application No. 201380025556.X, dated Aug. 3, 2016, 11 pages.
Patent Examination Report No. 1 from the Australian Patent Office for Application No. 2013231924, dated Jul. 11, 2016, 3 pages.
Patent Examination Report No. 1 from the Australian Patent Office for Application No. 2013231925, dated Jul. 11, 2016, 3 pages.
European Search Report and Written Opinion for Application No. 13760667.9, dated Sep. 8, 2016, 8 pages.
European Search Report and Written Opinion for Application No. 13761853.4, dated Sep. 8, 2016, 8 pages.
Second Office Action from the State Intellectual Property Office for the Peoples Republic of China for Application No. 201380025556. X, dated Apr. 19, 2017, 9 pages.

* cited by examiner

DEVICE AND METHOD FOR CONTROLLING TRANSMISSION TORQUE TO PROVIDE HILL ASCENT AND/OR DESCENT ASSISTANCE

CROSS-REFERENCE TO RELATED U.S. PATENT APPLICATION

This application claims priority to, and the benefit of, U.S. Provisional Patent Application Ser. No. 61/611,952 entitled "DEVICE AND METHOD FOR CONTROLLING TRANSMISSION TORQUE TO PROVIDE HILL ASCENT AND/OR DESCENT ASSISTANCE" by Jared Shattuck et al., which was filed on Mar. 16, 2012, the entirety of which is incorporated herein by reference.

TECHNICAL BACKGROUND

The present disclosure relates, generally, to transmission control systems and techniques and, more specifically, to devices, systems, and methods for controlling transmission torque to provide hill ascent and/or descent control assistance.

BACKGROUND

Transmissions are used to transfer a drive torque from a drive unit to a load. For example, in vehicular applications, a vehicle transmission transfers the drive torque from the vehicle engine to the vehicle load. Some transmissions include a finite set of gears, which may be selected to produce a specific transmission ratio. To do so, the transmissions may include one or more clutches, which may be engaged to select one or more gear sets to produce the required transmission ratio.

In automatic transmissions, the operation of the transmission may be controlled by a transmission control module (TCM), which is often embodied as an electronic circuit. The transmission control module may select, for example, one or more gear sets by causing engagement of the corresponding clutches. The transmission control module may control the operation of the automatic transmission based on one or more operation signals, such as transmission operation signals and engine operation signals. Such signals may be received by the transmission control module directly from the corresponding sensors. Alternatively, some of the signals used by the transmission control module may be received indirectly from an engine control module (ECM) of the vehicle, which monitors and controls the operation of the vehicle's engine. Further, in some vehicles, the transmission control module and the engine control module may be combined into, or otherwise included in, a powertrain control module (PCM). In this way, the transmission control module and the engine control module (or powertrain control module) operate together to control and monitor the operation of the vehicle's powertrain.

SUMMARY

According to one aspect, a transmission control module for controlling an automatic transmission of a vehicle may include a control circuit and a memory electrically coupled to the control circuit. The memory may have stored therein a plurality of instructions that, when executed by the control circuit, cause the control circuit to apply a clutch hold pressure to at least one clutch of the automatic transmission as a function of, at least one of, a transmission output speed signal indicative of a rotational output speed of the automatic transmission, a throttle signal indicative of application of a throttle of the vehicle, and a brake signal indicative of application of a brake of the vehicle. The clutch hold pressure may have a magnitude sufficient to lock an output shaft of the automatic transmission to resist roll-back of the vehicle.

In some embodiments, the control circuit may further compare the transmission output speed signal to an output speed threshold, compare the throttle signal to a throttle low threshold, and compare the brake signal to a brake low threshold. In such embodiments, the control circuit may release the clutch hold pressure in response to (i) the output speed signal being greater than the output speed threshold, (ii) the throttle signal being greater than the throttle low threshold; and (iii) the brake signal being less than the brake low threshold. Additionally or alternatively, in some embodiments, the control circuit may release the clutch hold pressure in response to determining that the automatic transmission has been disengaged from a forward or a reverse gear.

Additionally, in some embodiments, the control circuit of the transmission control module may compare the brake signal to a brake high threshold, compare the throttle signal to a throttle high threshold, and apply the clutch hold pressure in response to (i) the brake signal being greater than the brake high threshold and (ii) the throttle signal being less than the throttle high threshold. Additionally or alternatively, the control circuit may compare the brake signal to a brake high threshold, compare the throttle signal to a throttle high threshold, and release the clutch hold pressure in response to (i) the brake signal being greater than the brake high threshold and (ii) the throttle signal being greater than the throttle high threshold.

In some embodiments, the control circuit may further compare the brake signal to a brake high threshold, compare the throttle signal to a throttle high threshold and a throttle medium threshold and set a clutch release ramp rate to a high ramp rate in response to (i) the brake signal being less than the brake high threshold and (ii) the throttle signal being greater than the throttle medium threshold and less than the throttle high threshold. The control circuit may also adjust the clutch hold pressure as a function of the current clutch hold pressure and the clutch release ramp rate. In some embodiments, the control circuit may adjust the clutch hold pressure by setting the clutch hold pressure to the product of the current clutch hold pressure and the clutch release ramp rate. Further, in some embodiments, the control circuit may compare the throttle signal to a throttle low threshold and set the clutch release ramp rate to a low ramp rate in response to (i) the brake signal being less than the brake high threshold and (ii) the throttle signal being greater than the low throttle threshold and less than the throttle medium threshold. Yet further, in some embodiments, the control circuit may increment a clutch hold timer in response to (i) the brake signal being less than the brake high threshold and (ii) the throttle signal being less than the low throttle threshold, compare the clutch hold timer to a timer threshold, and perform one of the following: (i) set the clutch release ramp rate to the low ramp rate in response to the clutch hold timer being greater than the timer threshold and (ii) maintain the clutch hold pressure at a current clutch hold pressure in response to the clutch hold timer being less than the timer threshold.

Additionally, in some embodiments, the control circuit may compare the brake signal to a brake high threshold, compare the throttle signal to a throttle low threshold and a throttle medium threshold, set a clutch release ramp rate to a low ramp rate in response to (i) the brake signal being less than the brake high threshold and (ii) the throttle signal being greater than the low throttle threshold and less than the throttle medium threshold, and adjust the clutch hold pressure as a function of the current clutch hold pressure and the clutch release ramp rate. Additionally or alternatively, the control circuit may compare the brake signal to a brake high threshold, compare the throttle signal to a throttle low threshold, increment a clutch hold timer in response to (i) the brake signal being less than the brake high threshold and (ii) the throttle signal being less than the low throttle threshold, compare the clutch hold timer to a timer threshold, and perform one of the following: (i) set the clutch release ramp rate to the low ramp rate in response to the clutch hold timer being greater than the timer threshold and (ii) maintain the clutch hold pressure at a current clutch hold pressure in response to the clutch hold timer being less than the timer threshold.

According to another aspect, a method for controlling an automatic transmission of a vehicle may include receiving a transmission output speed signal indicative of a rotational output speed of the automatic transmission, receiving a throttle signal indicative of application of a throttle of the vehicle, and/or receiving a brake signal indicative of application of a brake of the vehicle. Additionally, the method may include applying a clutch hold pressure to at least one clutch of the automatic transmission as a function of (i) the transmission output speed signal, (ii) the throttle signal, and (ii) the brake signal, the clutch hold pressure having a magnitude sufficient to lock an output shaft of the automatic transmission to resist roll-back of the vehicle.

In some embodiments, the method may include comparing the transmission output speed signal to an output speed threshold, comparing the throttle signal to a throttle low threshold, comparing the brake signal to a brake low threshold, and releasing the clutch hold pressure in response (i) the output speed signal being greater than the output speed threshold, (ii) the throttle signal being greater than the throttle low threshold; and (iii) the brake signal being less than the brake low threshold. Additionally or alternatively, the may include releasing the clutch hold pressure in response to determining that the automatic transmission has been disengaged from a forward or a reverse gear.

In some embodiments, applying the clutch hold pressure may include comparing the brake signal to a brake high threshold, comparing the throttle signal to a throttle high threshold, and applying the clutch hold pressure in response to (i) the brake signal being greater than the brake high threshold and (ii) the throttle signal being less than the throttle high threshold. Additionally, in some embodiments, the method may include comparing the brake signal to a brake high threshold, comparing the throttle signal to a throttle high threshold, and releasing the clutch hold pressure in response to (i) the brake signal being greater than the brake high threshold and (ii) the throttle signal being greater than the throttle high threshold.

Yet further, in some embodiments, the method may include comparing the brake signal to a brake high threshold, comparing the throttle signal to a throttle high threshold and a throttle medium threshold, setting a clutch release ramp rate to a high ramp rate in response to (i) the brake signal being less than the brake high threshold and (ii) the throttle signal being greater than the throttle medium threshold and less than the throttle high threshold, and adjusting the clutch hold pressure as a function of the current clutch hold pressure and the clutch release ramp rate. Additionally, in some embodiments, adjusting the clutch hold pressure may include setting the clutch hold pressure to the product of the current clutch hold pressure and the clutch release ramp rate. The method may further include comparing the throttle signal to a throttle low threshold and setting the clutch release ramp rate to a low ramp rate in response to (i) the brake signal being less than the brake high threshold and (ii) the throttle signal being greater than the low throttle threshold and less than the throttle medium threshold. Additionally, the method may include incrementing a clutch hold timer in response to (i) the brake signal being less than the brake high threshold and (ii) the throttle signal being less than the low throttle threshold, comparing the clutch hold timer to a timer threshold, and performing one of the following: setting the clutch release ramp rate to the low ramp rate in response to the clutch hold timer being greater than the timer threshold and (ii) maintaining the clutch hold pressure at a current clutch hold pressure in response to the clutch hold timer being less than the timer threshold.

In some embodiments, the method may include comparing the brake signal to a brake high threshold, comparing the throttle signal to a throttle low threshold and a throttle medium threshold, setting a clutch release ramp rate to a low ramp rate in response to (i) the brake signal being less than the brake high threshold and (ii) the throttle signal being greater than the low throttle threshold and less than the throttle medium threshold, and adjusting the clutch hold pressure as a function of the current clutch hold pressure and the clutch release ramp rate. Additionally, in some embodiments, the method may include comparing the brake signal to a brake high threshold, comparing the throttle signal to a throttle low threshold, incrementing a clutch hold timer in response to (i) the brake signal being less than the brake high threshold and (ii) the throttle signal being less than the low throttle threshold, comparing the clutch hold timer to a timer threshold, and performing one of the following: (i) setting the clutch release ramp rate to the low ramp rate in response to the clutch hold timer being greater than the timer threshold and (ii) maintaining the clutch hold pressure at a current clutch hold pressure in response to the clutch hold timer being less than the timer threshold.

In some embodiments, receiving the transmission output speed signal may include receiving a transmission output speed signal from a transmission output sensor of the automatic transmission. Alternatively, in some embodiments receiving the throttle signal may include receiving a throttle signal from a throttle sensor of the vehicle. Additionally, in some embodiments, receiving the throttle signal may include receiving a throttle signal from an engine control module of the vehicle. Further, in some embodiments, the throttle signal may be indicative of a percentage of throttle displacement relative to a maximum throttle.

Additionally, in some embodiments, receiving the brake signal may include receiving the brake signal from a brake sensor of the vehicle. Alternatively, in some embodiments, receiving the brake signal may include receiving a brake signal from an engine control module of the vehicle. Further, in some embodiments, the brake signal may be indicative of a percentage of brake displacement relative to a maximum braking.

According to a further aspect, a system for controlling an automatic transmission of a vehicle may comprise a transmission output speed sensor, a throttle sensor, a brake sensor, and a transmission control module. The transmission output speed sensor may be coupled to the automatic transmission and configured to generate a transmission output speed signal indicative of a rotational output speed of the automatic transmission. The throttle sensor may be configured to generate a throttle signal indicative of application of a throttle of the vehicle, and the brake sensor may be configured to generate a brake signal indicative of application of a brake of the vehicle. The transmission control module may be configured to generate a clutch control signal to cause application of a clutch hold pressure to at least one clutch of the automatic transmission as a function of (i) the transmission output speed signal, (ii) the throttle signal, and (ii) the brake signal. The clutch hold pressure may have a magnitude sufficient to lock an output shaft of the automatic transmission to resist roll-back of the vehicle.

In some embodiments, the transmission control module may be configured to compare the transmission output speed signal to an output speed threshold, compare the throttle signal to a throttle low threshold, and compare the brake signal to a brake low threshold. In such embodiments, the transmission control module may be configured to generate a clutch control signal to release the clutch hold pressure in response to (i) the output speed signal being greater than the output speed threshold, (ii) the throttle signal being greater than the throttle low threshold; and (iii) the brake signal being less than the brake low threshold. Additionally or alternatively, in some embodiments, the transmission control module may be configured to generate a clutch control signal to release the clutch hold pressure in response to determining that the automatic transmission has been disengaged from a forward or a reverse gear.

Additionally, in some embodiments, the transmission control module may be configured to compare the brake signal to a brake high threshold, compare the throttle signal to a throttle high threshold, and generate a clutch control signal to cause application a clutch hold pressure in response to (i) the brake signal being greater than the brake high threshold and (ii) the throttle signal being less than the throttle high threshold. Additionally or alternatively, transmission control module may be configured to compare the brake signal to a brake high threshold, compare the throttle signal to a throttle high threshold, and generate a clutch control signal to release the clutch hold pressure in response to (i) the brake signal being greater than the brake high threshold and (ii) the throttle signal being greater than the throttle high threshold.

In some embodiments, the transmission control module may be further configured to compare the brake signal to a brake high threshold, compare the throttle signal to a throttle high threshold and a throttle medium threshold and set a clutch release ramp rate to a high ramp rate in response to (i) the brake signal being less than the brake high threshold and (ii) the throttle signal being greater than the throttle medium threshold and less than the throttle high threshold. The transmission control module may generate a clutch control signal to adjust the clutch hold pressure as a function of the current clutch hold pressure and the clutch release ramp rate. In some embodiments, the transmission control module may adjust the clutch hold pressure by setting the clutch hold pressure to the product of the current clutch hold pressure and the clutch release ramp rate. Further, in some embodiments, the transmission control module may compare the throttle signal to a throttle low threshold and set the clutch release ramp rate to a low ramp rate in response to (i) the brake signal being less than the brake high threshold and (ii) the throttle signal being greater than the low throttle threshold and less than the throttle medium threshold. Yet further, in some embodiments, the transmission control module may increment a clutch hold timer in response to (i) the brake signal being less than the brake high threshold and (ii) the throttle signal being less than the low throttle threshold, compare the clutch hold timer to a timer threshold, and perform one of the following: (i) set the clutch release ramp rate to the low ramp rate in response to the clutch hold timer being greater than the timer threshold and (ii) maintain the clutch hold pressure at a current clutch hold pressure in response to the clutch hold timer being less than the timer threshold.

DETAILED DESCRIPTION OF THE DRAWINGS

Figure 1:
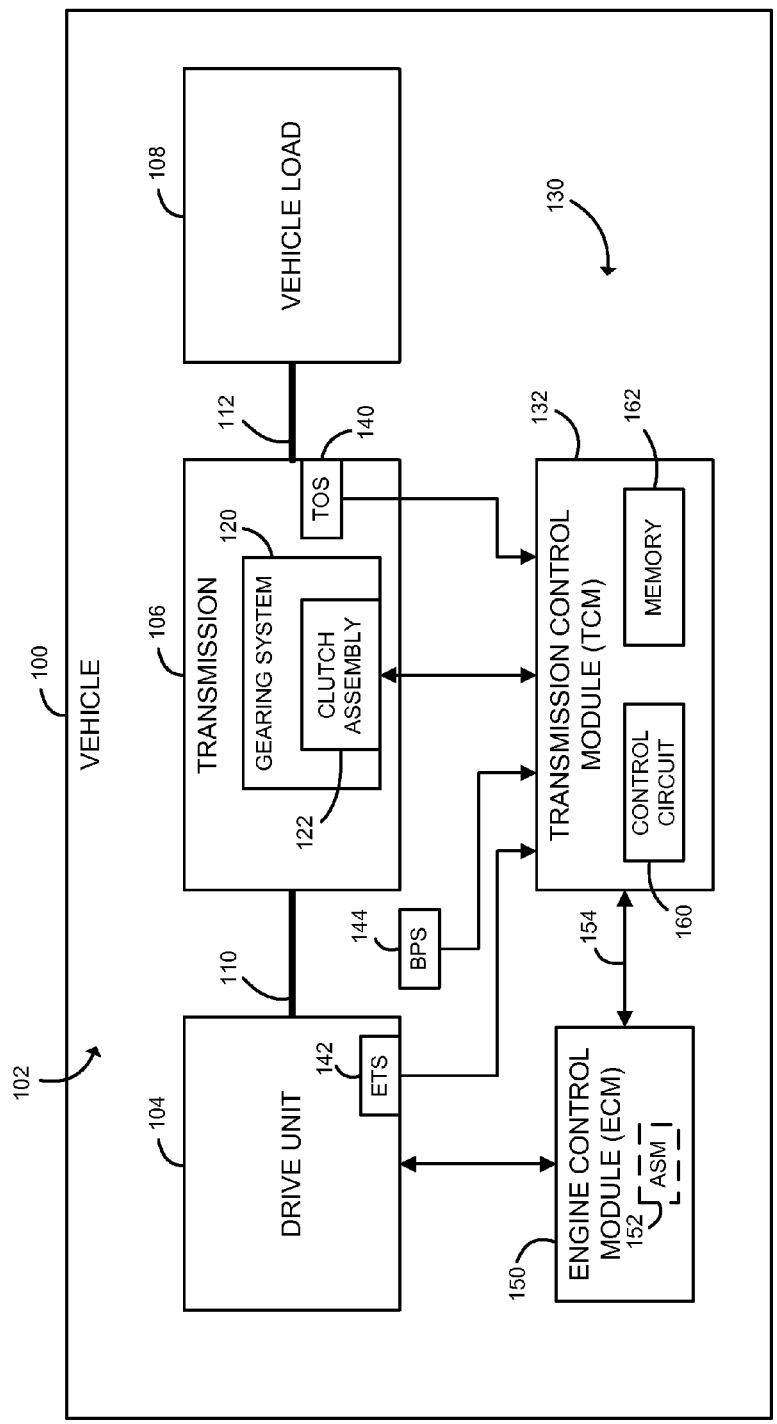
FIG. 1 is a simplified block diagram of at least one embodiment of a system for controlling transmission torque of a transmission of a vehicle to provide hill ascent and/or descent assistance to the vehicle.

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present disclosure. It will be appreciated, however, by one skilled in the art that embodiments of the disclosure may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention implemented in a computer system may include one or more bus-based interconnects or links between components and/or one or more point-to-point interconnects between components. Embodiments of the invention may also be implemented as instructions carried by or stored on a transitory or non-transitory machine-readable medium, which may be read and executed by one or more processors. A machine-readable medium may be embodied as any device, mechanism, or physical structure for storing or transmitting information in a form readable by a machine (e.g., a computing device). For example, a machine-readable medium may be embodied as read only memory (ROM); random access memory (RAM); magnetic disk storage media; optical storage media; flash memory devices; mini- or micro-SD cards, memory sticks, electrical signals, and others.

In the drawings, specific arrangements or orderings of schematic elements, such as those representing devices, modules, instruction blocks and data elements, may be shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some embodiments.

In general, schematic elements used to represent instruction blocks may be implemented using any suitable form of machine-readable instruction, such as software or firmware applications, programs, functions, modules, routines, processes, procedures, plug-ins, applets, widgets, code fragments and/or others, and that each such instruction may be implemented using any suitable programming language, library, application programming interface (API), and/or other software development tools. For example, some embodiments may be implemented using Java, C++, and/or other programming languages. Similarly, schematic elements used to represent data or information may be implemented using any suitable electronic arrangement or structure, such as a register, data store, table, record, array, index, hash, map, tree, list, graph, file (of any file type), folder, directory, database, and/or others.

Further, in the drawings, where connecting elements, such as solid or dashed lines or arrows, are used to illustrate a connection, relationship or association between or among two or more other schematic elements, the absence of any such connecting elements is not meant to imply that no connection, relationship or association can exist. In other words, some connections, relationships or associations between elements may not be shown in the drawings so as not to obscure the disclosure. In addition, for ease of illustration, a single connecting element may be used to represent multiple connections, relationships or associations between elements. For example, where a connecting element represents a communication of signals, data or instructions, it should be understood by those skilled in the art that such element may represent one or multiple signal paths (e.g., a bus), as may be needed, to effect the communication.

The present disclosure is directed to a system and associated method for assisting the operation of a vehicle when the vehicle is attempting to traverse an incline or a decline (e.g., during hill ascent or descent). With a typical vehicle, the operator of the vehicle may experience an amount of roll-back or roll-forward of the vehicle when attempting to accelerate initially from a stationary or near-stationary position while positioned on an incline or decline. For example, when traversing a hill, the typical vehicle may roll-back some amount when the operator of the vehicle moves his/her foot from the brake pedal to the accelerator pedal. As discussed in more detail below, the illustrative control system and method assist the operation of a vehicle traversing such inclines/declines by controlling a transmission of the vehicle so as to resist the rolling (i.e., roll-back or roll-forward) of the vehicle.

Referring now to FIG. 1, in one embodiment, an illustrative vehicle 100 includes a drive train 102. The drive train 102 includes a drive unit 104, a transmission 106, and a vehicle load 108, which is driven by the transmission 106. The drive unit 104 is illustratively embodied as a diesel internal combustion engine. However, in other embodiments, the drive unit 104 may be embodied as a spark-ignition type internal combustion engine (i.e. gasoline engine), a hybrid engine-electric motor combination, or another source of rotational power. The drive unit 104 includes a drive unit output shaft 110 that provides rotational power to the transmission 106. Similarly, the transmission 108 includes an output shaft 112 that provides rotational power to the vehicle load 108 when the transmission 108 is engaged (i.e., is in a forward or reverse gear).

The transmission 106 is illustratively embodied as an automatic transmission and is operable to transmit the rotational power from the drive unit 104 to the vehicle load 108 at various transmission ratios. The transmission ratio provided by the transmission 106 is selected based on a gearing system 120. In the illustrative embodiment, the gearing system 120 is embodied as a planetary gearing system, but other gearing system configurations may be used in other embodiments. The gearing system 120 includes a plurality of gear sets, which may be engaged to select a desired transmission ratio. Depending on the type of transmission one, two, or more gear sets may be engaged to achieve the desired transmission ratio. The gear sets of the gearing system 120 are engaged via use of a clutch assembly 122 of the transmission 106. The clutch assembly 122 includes a plurality of clutches that may be applied to engage one or more gear sets. The specific number of gear sets of the gearing system 120 and clutches of the clutch assembly 122 may depend on the type of transmission 106, the number of operational modes/ranges, and/or criteria. For example, in some eight-speed transmissions, the gearing system may include four planetary gear sets and five clutches (e.g., C1, C2, C3, C4, and C5), which may be applied individually or in sets to select one or more of the gear sets.

As discussed above, the illustrative vehicle 100 includes a control system 130 for controlling the transmission 106 to provide assistance during hill ascent/descent of the vehicle 100. The control system 130 includes a transmission control module 132 configured to control operation of a clutch assembly 114 of the transmission 106 to assist operation of the vehicle 100 when the vehicle 104 is attempting to traverse an incline or a decline (e.g., during hill ascent or descent). To do so, in one embodiment as discussed in more detail below, the transmission control module 132 is configured to apply a clutch hold pressure to one or more clutches of the clutch assembly 122 to "lock" the output shaft 112 of the transmission 106 to resist rolling of the vehicle 100 when the vehicle 100 is attempting to transverse an incline/decline (i.e., at initial acceleration from a stationary or near stationary position).

The transmission control module 132 applies the clutch hold pressure based on, or as a function of, a plurality of vehicle operation signals including a transmission output speed signal indicative of a rotational output speed of the output shaft 112 of the transmission 106, a throttle signal indicative of application of an engine throttle (e.g., amount of throttle displacement), and a brake signal indicative of application of a brake of the vehicle. As discussed in more detail below with regard to FIGS. 2 and 3, the transmission control module 132 uses those vehicle operation signals to determine an amount of clutch pressure to be applied, and length of such clutch pressure application, to the one or more clutches of the clutch assembly 122 to hold the vehicle in a substantially steady-state prior to an acceleration request from an operator of the vehicle 100 sufficient to overcome the rolling (i.e., roll-back or roll-forward) of the vehicle 100.

In some embodiments, the transmission control module 132 may be configured to receive some or all of the vehicle operation signals directly from corresponding sensors. In such embodiments, the system 130 may include a transmission output sensor (TOS) 140 coupled to the transmission 106 and configured to generate the transmission output speed signal indicative of the rotational output speed of the output shaft 112 of the transmission 106. The transmission output sensor 140 may be embodied as any type of sensor suitable to generate such an output signal.

The system 130 may also include an engine throttle sensor (ETS) 142 configured to generate the throttle signal indicative of the application of an engine throttle of the vehicle 100. In some embodiments, the throttle signal may be indicative of a percentage of throttle displacement, or application, relative to a fully applied or "open" throttle (e.g., 10% throttle). In the illustrative embodiment of FIG. 1, the engine throttle sensor 142 is coupled to the drive unit 104 to sense application of a throttle of the drive unit 104. However, in other embodiments, the throttle sensor 142 may be coupled to the accelerator pedal of the vehicle 100.

The system 130 may further include a brake pressure sensor 144 configured to generate a brake signal indicative of the application of a brake of the vehicle 100. In some embodiments, the brake signal may be embodied as a binary, or near-binary, signal (i.e., the brake is applied or is not applied). However, in other embodiments, the brake signal may be indicative of the amount of pressure (e.g., a percentage value or a pressure value) applied to the vehicle brakes. In the illustrative embodiment of FIG. 1, the brake pressure sensor 144 is coupled to the brake pedal, or linkage thereof, of the vehicle 100. Alternatively, in embodiments in which the brake signal is indicative of an amount of pressure applied to the vehicle brakes, the brake pressure sensor 144 may be coupled to a brake air or hydraulic system of the vehicle 100 to detect an amount of pressure within the brake air/hydraulic system. Additionally, in other embodiments, the brake signal may be received by the transmission control module 132 from another module of the vehicle 100 rather than directly from the brake sensor 144. For example, the transmission control module 132 may receive the brake signal from the engine control module 150, from a brake controller (such as an anti-lock brake controller), or from another module of the vehicle 100.

In some embodiments, the system 130 may further include an engine control module 150. In such embodiments, the engine control module 150 may be configured to initially receive one or more of the vehicle operation signals and subsequently transmit, or otherwise provide, such vehicle operation signals to the transmission control module 132 over a communication link 154 (e.g., a Controller Area Network (CAN) bus). For example, in embodiments wherein the accelerator pedal of the vehicle 100 is an electronic accelerator, the engine control module 150 may include an accelerator sensor module 152 to generate the throttle signal as a function of the operator's displacement of the accelerator pedal, which is subsequently provided to the transmission control module 132 via the communication link 154. Additionally, other signals, such as the brake signal, may be initially received by the engine control module 150 and provided the transmission control module 132.

The transmission control module 132 may be embodied as any type of transmission control module capable of performing the functions described herein. In some embodiments, the control module 132 may be incorporated in a powertrain control module (PCM) along with the engine control module 150. The illustrative transmission control module 132 of FIG. 1 includes a control circuit 160 and an associated memory 162. The control circuit 160 may be embodied as any type of control circuit capable of controlling functions of the transmission 106 as described below. For example, the control circuit 160 may be embodied as one or more microprocessors, digital signal processors, microcontrollers, discrete circuitry, and/or the like. The memory 162 of the transmission control module 132 may be embodied as or otherwise include one or more memory devices or data storage locations including, for example, dynamic random access memory devices (DRAM), synchronous dynamic random access memory devices (SDRAM), double-data rate synchronous dynamic random access memory device (DDR SDRAM), mask read-only memory (ROM) devices, erasable programmable ROM (EPROM), electrically erasable programmable ROM (EEPROM) devices, flash memory devices, and/or other volatile and/or non-volatile memory devices. In some embodiments, the memory 162 includes a plurality of instructions that are executed by the control circuit 160 during operation of the transmission control module 132 as discussed below.

Figure 2:
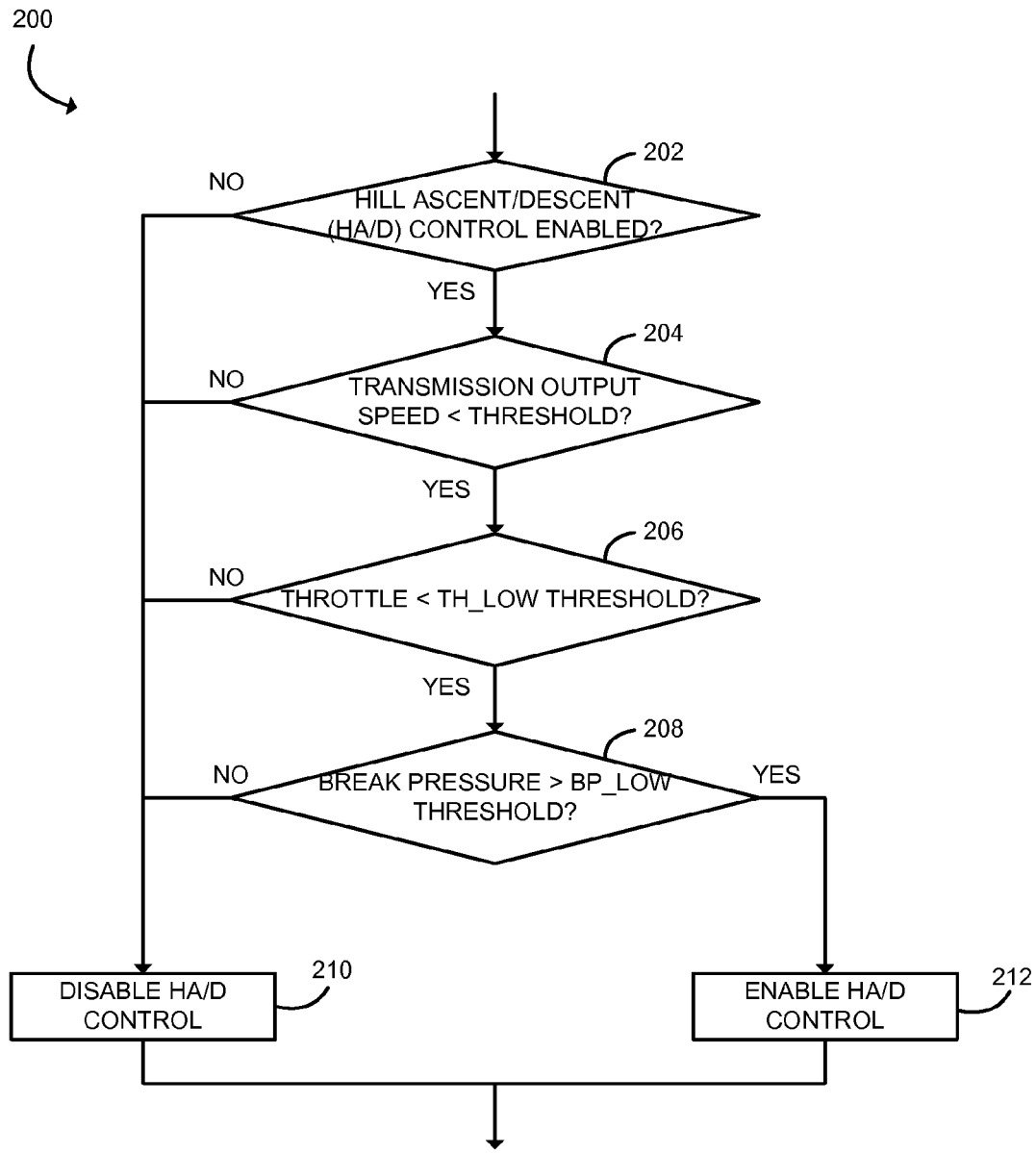
FIG. 2, is a simplified block diagram of at least one embodiment of a method of enabling a transmission control.

Referring now to FIG. 2, in one embodiment, the transmission control module 132 may be configured to execute a method 200 for enabling hill ascent/descent transmission control of the transmission 106. The method 200 begins with block 202 in which the transmission control module 132 determines whether to enable the hill ascent/descent transmission control feature. The enablement of the transmission control may be based on any one or more criteria such as user selection, environmental conditions, and/or other criteria. If the transmission control module 132 determines that the transmission control should not be enabled, the method 200 advances to block 210 in which the hill ascent/descent transmission control is disabled. However, if the transmission control module 132 determines that hill ascent/descent transmission control should be enable, the method 200 advances to block 204.

In block 204, the transmission control module 132 compares the transmission output speed signal received from the transmission output sensor 140 to a transmission speed threshold to determine whether the current rotational output speed of the transmission output shaft 112 is below a maximum threshold (i.e., whether the transmission 106 is initially engaged to move the vehicle 100 from a stationary or near stationary position). In the illustrative embodiment, the transmission speed threshold is about 25 revolutions per minute, but other transmission speed threshold values may be used in other embodiments based on any one or more criteria such as vehicle type, vehicle mass, transmission type, locality, and/or the like. If the transmission output speed is determined to be greater than the transmission speed threshold, the method 200 advances to block 210 in which the hill ascent/descent transmission control is disabled. However, if transmission output speed is determined to be equal to or less than the transmission speed threshold, the method 200 advances to block 206.

In block 206, the transmission control module 132 compares the throttle signal received from the engine throttle sensor 142 (or from the engine control module 150) to a throttle low threshold to determine whether the vehicle 100 is stopped or otherwise at a substantially stationary position. In the illustrative embodiment, the low throttle threshold is set within the range of about 2%-3% throttle displacement. Of course, in other embodiments, other throttle low thresholds may be used to determine whether the vehicle 100 is stopped or near-stationary. If the throttle signal is determined to be greater than the throttle low threshold, the method 200 advances to block 210 in which the hill ascent/descent transmission control is disabled. However, if throttle signal is determined to be equal to or less than the throttle low threshold, the method 200 advances to block 208.

In block 208, the transmission control module 132 compares the brake signal received from the brake sensor 144 (or from the engine control module 150) to a brake low pressure threshold to determine whether an operator of the vehicle 100 is applying the brake (e.g., whether the operator has his/her foot on the brake). In embodiments in which the brake signal is embodied as a binary state signal (i.e., brake on/off signal), the brake low pressure threshold may embodied as a simple on-state check. Alternatively, in embodiments in which the brake signal is embodied as a pressure value or percentage, the brake low pressure threshold may be embodied a corresponding pressure value or percentage. In the illustrative embodiment, the low brake pressure threshold is about 10 pounds per square inch (PSI). Of course, in other embodiments, other brake low thresholds may be used. For example, in the illustrative embodiments, the vehicle 100 is fitted with an air brake system. However, in other embodiments, the brake system of the vehicle 100 may be embodied as a hydraulic brake system or other type of brake system. In such other embodiments, the low brake pressure threshold, and other brake pressure thresholds discussed below, may be adjusted or otherwise dependent on the type of brake system included in the vehicle 100.

If the brake signal is determined to be less than the low brake threshold, the method 200 advances to block 210 in which the hill ascent/descent transmission control is disabled. However, if brake signal is determined to be equal to or greater than the brake low pressure threshold, the method 200 advances to block 212 in which the hill ascent/descent transmission control is enabled.

Figure 3A:
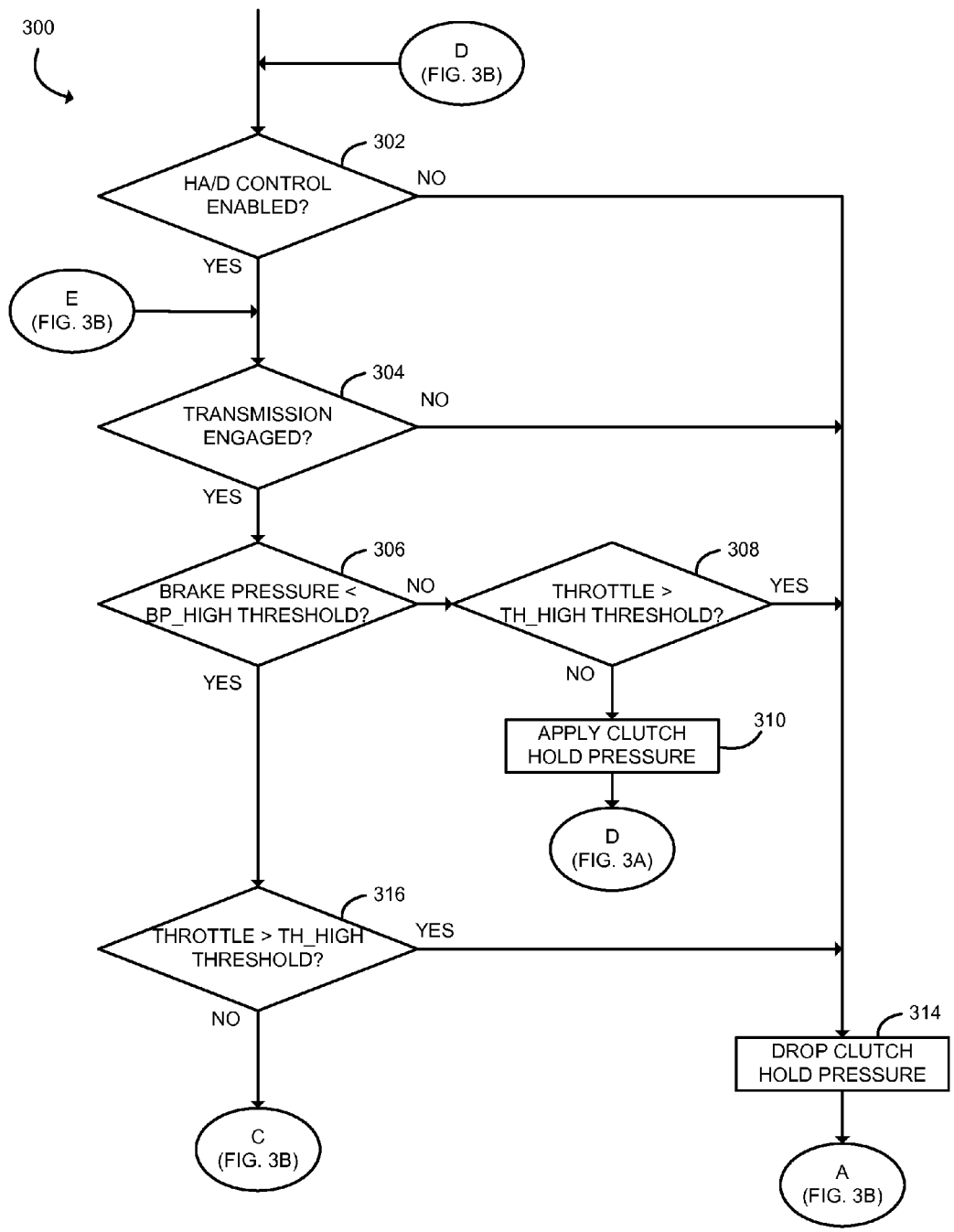
FIGS. 3A and 3B is a simplified block diagram of at least one embodiment of a method for controlling transmission torque of the transmission of the vehicle of FIG. 1 to provide hill ascent and/or descent assistance.
Figure 3B:
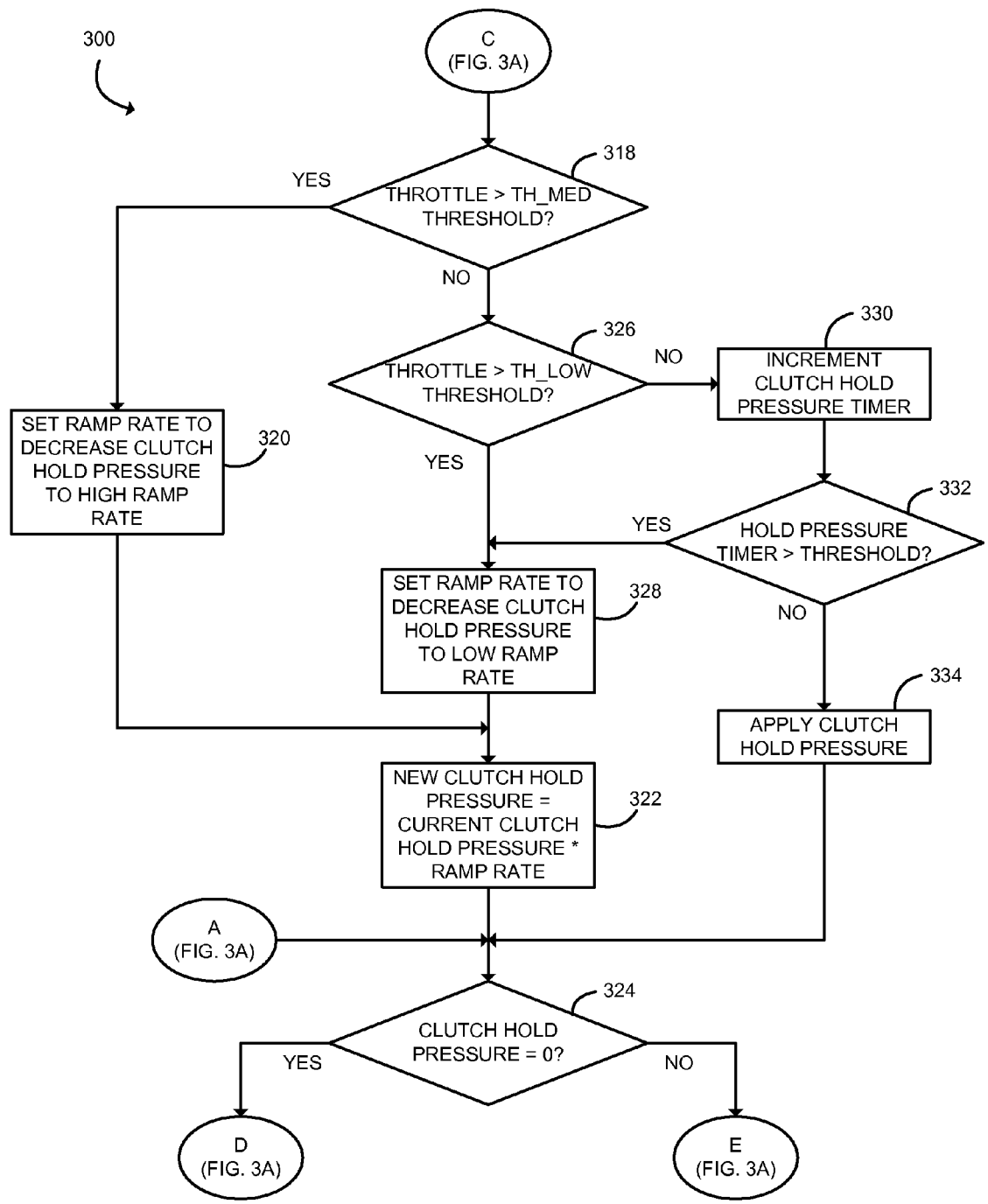

Referring now to FIGS. 3A and 3B, in operation, the transmission control module 132 may execute a method 300 for controlling transmission torque of the transmission 106 of the vehicle 100 to provide hill ascent and/or descent assistance. The method 300 begins with block 302 in which the transmission control module 132 determines whether the hill ascent/descent control feature has been enabled. As discussed above, the transmission control module 132 may execute the method 200 to enable or disable the hill ascent/descent control feature.

If the transmission control module 132 determines, in block 302, that hill ascent/descent control feature is enabled, the method 300 advances to block 304 in which the transmission control module 132 determines whether the transmission 106 is engaged. That is, the transmission control module 132 determines whether the transmission 106 is in a forward gear or a reverse gear (i.e., not parked or neutral). The transmission control module 132 may determine whether the transmission 106 is engaged using any suitable methodology. For example, in some embodiments, the system 130 may include a shift sensor coupled to the transmission 106, a shift selector of the vehicle 100, or other component of the vehicle 100 to detect the current shift state of the transmission 106.

If transmission control module 132 determines that the transmission 106 is engaged, the method 300 advances to block 306 in which the transmission control module 132 compares the brake signal received form the brake sensor 144 (or from the engine control module 150) to a brake high or upper brake threshold. That is, in block 306, the transmission control module 132 determines whether the operator of the vehicle has the brake fully applied (or near fully applied) or is in the process of, for example, switching his/her foot from the brake pedal to the accelerator. Again, in embodiments in which the brake signal is embodied as a binary state signal (i.e., brake on/off signal), the brake high pressure threshold may embodied as a simple on-state check. Alternatively, in embodiments in which the brake signal is embodied as a pressure value or percentage, the brake high pressure threshold may be embodied a corresponding pressure value or percentage. In the illustrative embodiment, the brake high pressure threshold is about 45 pounds per square inch (PSI). Of course, in other embodiments, other brake high thresholds may be used.

If the transmission control module 132 determines that the brake signal is equal to or greater than the brake pressure high threshold, the method 300 advances to block 308. In block 308, the transmission control module 132 compares the throttle signal received from the engine throttle sensor 142 (or from the engine control module 150) to a throttle high threshold to determine whether the operator has applied enough accelerator to overcome the roll-back or roll-forward of the vehicle 100 (i.e., whether the operator is now fully in acceleration mode). Illustratively, the throttle high threshold is equal to about 80% throttle displacement, but other throttle high threshold values may be used in other embodiments based on, for example, the type of drive unit 104 or transmission 106, the vehicle load 108, various environmental factors, and/or other criteria.

If the transmission control module 132 determines that throttle signal is equal to or less than throttle high threshold, the method 300 advances to block 310 in which a clutch hold pressure is applied to the clutch assembly 122. That is, the transmission control module 132 generates a clutch signal to engage one or more clutches of the clutch assembly 122 to apply the clutch hold pressure. The clutches of the clutch assembly 122 are engaged to "lock" the transmission 106 or otherwise apply an amount of transmission torque to the output shaft 112 of the transmission 106 to resist the rolling (i.e., roll-back or roll-forward) of the vehicle 100. To do so, a sufficient clutch hold pressure is selected, or otherwise determined, to hold the vehicle 100 in the current stationary or near-stationary position (i.e., resist the rolling of the vehicle 100). The magnitude of the initial clutch hold pressure may be preset or may be determined based on various criteria such as the type of transmission 106, the vehicle load 108, and/or other criteria. In the illustrative embodiment, the initial clutch hold pressure is equal to about 45 PSI, but clutch hold pressures of other magnitudes may be used in other embodiments. Additionally, in the illustrative embodiment, two clutches (e.g., clutches C4 and C5) of the clutch assembly 122 are engaged to "lock" the transmission 106. However, the number and selection of clutches engage in block 310 may depend on, for example, the type of transmission 106, the gearing system 120, and/or other criteria. After the clutch hold pressure is applied to the clutch assembly 122 in block 310, the method 300 loops back to block 302.

Referring back to blocks 302, 304, and 308, if the transmission control module 132 determines that the hill ascent/descent control feature is not enabled in block 302, that the transmission 106 is not engaged in block 304, or that the throttle signal is greater than the throttle high threshold, the method 300 advances to block 314. In block 314, any clutch hold pressure currently applied to the clutch assembly 122 based on the method 300 is dropped or otherwise released. The method 300 subsequently advances to block 324 (see FIG. 3B) in which the transmission control module 132 determines whether the current clutch hold pressure is substantially zero. If so, the method 300 loops back to block 302 in which the transmission control module 132 again determines whether the hill/ascent transmission control feature is enabled. However, if the current clutch hold pressure is not substantially zero, the method 300 advances to block 304 in which the transmission control module 132 again determines whether the transmission 106 is engaged as discussed above.

Referring now back to block 306, if the transmission control module 132 determines that the brake signal is less than the brake pressure high threshold, the method 300 advances to block 316. In block 316, similar to block 308, the transmission control module 132 compares the throttle signal received from the engine throttle sensor 142 (or from the engine control module 150) to the throttle high threshold to determine whether the operator has applied enough accelerator to overcome the roll-back or roll-forward of the vehicle 100. If so, the method advances to block 314 wherein the any clutch hold pressure currently applied to the clutch assembly 122 based on the method 300 is dropped or otherwise released as discussed above. If, however, transmission control module 132 determines that the throttle signal is less than the throttle high threshold in block 316, the method 300 advances to block 318 (see FIG. 3B).

In block 318, the transmission control module 132 compares the throttle signal to a throttle medium threshold. The throttle medium threshold is less than the throttle high threshold and is selected so as to determine whether the operator of the vehicle 100 is in the process of applying the accelerator pedal (i.e., moving his/her foot from the brake pedal to the accelerator pedal). In the illustrative embodiment, the throttle medium threshold is equal to about 60% throttle displacement. Of course, other throttle medium thresholds may be used in other embodiments based on the type of drive unit 104, the type of transmission 106, the type of vehicle load 108, and/or the like.

If the transmission control module 132 determines that the throttle signal is greater than the throttle medium threshold (i.e., greater than the throttle medium threshold and less than the throttle high threshold), the method 300 advances to block 320 in which a ramp rate to decrease the clutch hold pressure is set to a relatively high ramp rate. The particular value of the high ramp rate may be determined, or otherwise based on, any one or more of a number of criteria such as the current clutch hold pressure, the throttle signal, the type of transmission 106, and/or other criteria. The ramp rate may be expressed in any suitable format such as, for example, a percentage of pressure drop per time period, a magnitude of pressure drop per time period, and/or the like. In the illustrative embodiment, the high ramp rate is about 15 PSI per second. Of course, a high ramp rate having a different magnitude may be used in other embodiments.

After the ramp rate has been set to the high ramp rate in block 318, the method 300 advances to block 322 in which a new clutch hold pressure is determined based on the current clutch hold pressure and the current ramp rate. To do so, in the illustrative embodiment, the transmission control module 132 multiplies the current clutch hold pressure and the current ramp rate to determine the new clutch hold pressure. Of course, in other embodiments, other methods for calculating or otherwise determining the new clutch hold pressure based on the current clutch hold pressure and the current ramp rate may be used. For example, in some embodiments, a look-up table may be used. As discussed above, the ramp rate may be embodied as a reduction in pressure over time. In such embodiments, the new clutch hold pressure continues to decrease over time according to the current ramp rate.

After the new clutch pressure has been calculated, or otherwise determined, in block 320, the method 300 advances to block 324 in which the transmission control module 132 again determines whether the clutch hold pressure is substantially zero. If so, the method 300 loops back to block 302 in which the transmission control module 132 again determines whether the hill/ascent transmission control feature is enabled. However, if the current clutch hold pressure is not substantially zero, the method 300 advances to block 304 in which the transmission control module 132 again determines whether the transmission 106 is engaged as discussed above.

Referring back to block 318, if the transmission control module determines that the throttle signal is equal to or less than the throttle medium threshold, the method 300 advances to block 326. In block 326, the transmission control module 132 compares the throttle signal to a throttle low threshold. The throttle low threshold is less than the throttle medium threshold and is selected so as to determine whether the operator of the vehicle 100 has started applying the accelerator. In the illustrative embodiment, the throttle low threshold is equal to about 30% throttle displacement. Of course, other throttle low thresholds may be used in other embodiments based on the type of drive unit 104, the type of transmission 106, the type of vehicle load 108, and/or the like.

If the transmission control module 132 determines that the throttle signal is greater than the throttle low threshold (i.e., greater than the throttle low threshold and less than the throttle medium threshold), the method 300 advances to block 328 in which the ramp rate is set to a relatively low ramp rate. The particular value of the low ramp rate may be determined, or otherwise based on, any one or more of a number of criteria such as the current clutch hold pressure, the throttle signal, the type of transmission 106, and/or other criteria. In the illustrative embodiment, the low ramp rate is about 7.5 PSI per second. Of course, a low ramp rate having a different magnitude may be used in other embodiments.

After the ramp rate has been set to the low ramp rate in block 328, the method 300 advances to block 322 in which a new clutch hold pressure is determined based on the current clutch hold pressure and the current ramp rate as discussed above. It should be appreciated that the ramp rates are used to "bleed off" or otherwise reduce the clutch hold pressure according to where the operator is in the process of switching from the brake pedal to the full accelerator. If the operators has just released the brake and is initially applying the accelerator (i.e., the throttle is less than the throttle medium threshold and greater than the throttle low threshold), the clutch hold pressure is released or decreased at a relatively slow rate. However, if the operator has related the brake and is in the process of fully applying the accelerator (i.e., the throttle is less than the throttle high threshold and greater than the medium threshold), the clutch hold pressure is released or decreased at a relatively high rate. In this way, the method 300 is responsive to the state of the acceleration from the stationary position of the vehicle 100.

Referring back to block 326, if the transmission control module 132 determines that the throttle signal is equal to or less than the throttle low threshold, the method 300 advances to block 330. In block 330, a clutch hold pressure timer is incremented. In the illustrative embodiment, the clutch hold pressure timer is used to ensure that the operator of the vehicle 100 has not left the vehicle 100. That is, the clutch hold pressure is held only for a reference time period when the transmission control module 132 determines that the brake pedal not fully applied (see block 306) and the throttle is less than the throttle low threshold (see block 326) so as to prevent the vehicle 100 from being held in a stationary or near stationary position while unattended.

After the clutch hold pressure timer is incremented in block 330, the method 300 advances to block 332 in which the transmission control module 132 compares the clutch hold pressure timer to a timer threshold. The value of the timer threshold may be selected, or otherwise determined, based on any one or more criteria such as the type of vehicle 100, the type of transmission 106, and/or other criteria. In the illustrative embodiment, the timer threshold is equal to about 3.0 seconds; however, timer thresholds having other values may be used in other embodiments.

If the transmission control module 132 determines that the current clutch hold pressure timer is greater than the timer threshold, the method 300 advances to block 328 in which the ramp rate is set to the low ramp rate to begin to "bleed off" the clutch pressure as discussed above. If, however, the transmission control module 132 determines that the clutch pressure timer is not greater than the timer threshold, the method 300 advances to block 334 in which the clutch hold pressure is applied to the clutch assembly 122 or otherwise maintained. To do so, as discussed above with regard to block 310, the transmission control module 132 generates a clutch signal to engage one or more clutches of the clutch assembly 122 to apply the clutch hold pressure. The clutches of the clutch assembly 122 are engaged to "lock" the transmission 106 or otherwise apply an amount of transmission torque to the output shaft 112 of the transmission 106 to resist the rolling (i.e., roll-back or roll-forward) of the vehicle 100. The magnitude of the clutch hold pressure is selected, or otherwise determined, to hold the vehicle 100 in the current stationary or near-stationary position (i.e., resist the rolling of the vehicle 100). The magnitude of the initial clutch hold pressure may be preset or may be determined based on various criteria such as the type of transmission 106, the vehicle load 108, and/or other criteria. In the illustrative embodiment, the initial clutch hold pressure is equal to about 45 PSI, but clutch hold pressures of other magnitudes may be used in other embodiments.

After the clutch hold pressure is applied or maintained in block 334, the method 300 advances to block 324 in which the transmission control module 132 again determines whether the clutch hold pressure is substantially zero. If so, the method 300 loops back to block 302 in which the transmission control module 132 again determines whether the hill/ascent transmission control feature is enabled. However, if the current clutch hold pressure is not substantially zero, the method 300 advances to block 304 in which the transmission control module 132 again determines whether the transmission 106 is engaged as discussed above.

It should be appreciated that the methods 200 and 300 have been described above with regard to the illustrative FIGS. 2 and 3 in which blocks of the methods 200 and 300 are shown in an illustrative format and sequence. However, it should be appreciate that in other embodiments some of the blocks of the methods 200 and 300 may be performed contemporaneously with other blocks and/or performed in an alternative sequence. As such, the methods 200 and 300 are not limited to the particular sequence of blocks illustrated in FIGS. 2 and 3. Additionally, it should be appreciated that the methods 200 and 300 may be executed in parallel, or otherwise contemporaneously, with each other with each other.

While the disclosure has been illustrated and described in detail in the drawings and foregoing description, such an illustration and description is to be considered as exemplary and not restrictive in character, it being understood that only illustrative embodiments have been shown and described and that all changes and modifications consistent with the disclosure and recited claims are desired to be protected.

The invention claimed is:

1. A transmission control module for controlling an automatic transmission of a vehicle, the transmission control module comprising:
    a control circuit; and
    a memory electrically coupled to the control circuit and having stored therein a plurality of instructions that, when executed by the control circuit, cause the control circuit to:
        apply a clutch hold pressure to at least one clutch of the automatic transmission as a function of (i) a transmission output speed signal indicative of a rotational output speed of the automatic transmission, (ii) a throttle signal indicative of application of a throttle of the vehicle, and (iii) a brake signal indicative of application of a brake of the vehicle,
        compare the brake signal to a brake high threshold,
        compare the throttle signal to a throttle high threshold and a throttle medium threshold,
        set a clutch release ramp rate to a high ramp rate in response to (i) the brake signal being less than the brake high threshold and (ii) the throttle signal being greater than the throttle medium threshold and less than the throttle high threshold, and
        adjust the clutch hold pressure as a function of the current clutch hold pressure and the clutch release ramp rate,
    wherein the clutch hold pressure has a magnitude sufficient to lock an output shaft of the automatic transmission to resist roll-back of the vehicle.

2. The transmission control module of claim 1, wherein the plurality of instructions cause the control circuit to:
    compare the transmission output speed signal to an output speed threshold;
    compare the throttle signal to a throttle low threshold;
    compare the brake signal to a brake low threshold; and
    release the clutch hold pressure in response to (i) the output speed signal being greater than the output speed threshold, (ii) the throttle signal being greater than the throttle low threshold; and (iii) the brake signal being less than the brake low threshold.

3. The transmission control module of claim 1 wherein the plurality of instructions further cause the control circuit to release the clutch hold pressure in response to determining that the automatic transmission has been disengaged from a forward or a reverse gear.

4. The transmission control module of claim 1, wherein the plurality of instructions cause the control circuit to:
compare the brake signal to a brake high threshold;
compare the throttle signal to a throttle high threshold; and
apply the clutch hold pressure in response to (i) the brake signal being greater than the brake high threshold and (ii) the throttle signal being less than the throttle high threshold.

5. The transmission control module of claim 1, wherein the plurality of instructions further cause the control circuit to:
compare the brake signal to a brake high threshold;
compare the throttle signal to a throttle high threshold; and
release the clutch hold pressure in response to (i) the brake signal being greater than the brake high threshold and (ii) the throttle signal being greater than the throttle high threshold.

6. The transmission control module of claim 1, wherein to adjust the clutch hold pressure comprises to set the clutch hold pressure to the product of the current clutch hold pressure and the clutch release ramp rate.

7. The transmission control module of claim 1, wherein the plurality of instructions further cause the control circuit to:
compare the throttle signal to a throttle low threshold; and
set the clutch release ramp rate to a low ramp rate in response to (i) the brake signal being less than the brake high threshold and (ii) the throttle signal being greater than the throttle low threshold and less than the throttle medium threshold.

8. The transmission control module of claim 7, wherein the plurality of instructions further cause the control circuit to:
increment a clutch hold timer in response to (i) the brake signal being less than the brake high threshold and (ii) the throttle signal being less than the throttle low threshold;
compare the clutch hold timer to a timer threshold; and
perform one of the following:
set the clutch release ramp rate to the low ramp rate in response to the clutch hold timer being greater than the timer threshold, and
maintain the clutch hold pressure at a current clutch hold pressure in response to the clutch hold timer being less than the timer threshold.

9. The transmission control module of claim 1, wherein the plurality of instructions further cause the control circuit to:
compare the brake signal to a brake high threshold;
compare the throttle signal to a throttle low threshold and a throttle medium threshold;
set a clutch release ramp rate to a low ramp rate in response to (i) the brake signal being less than the brake high threshold and (ii) the throttle signal being greater than the throttle low threshold and less than the throttle medium threshold; and
adjust the clutch hold pressure as a function of the current clutch hold pressure and the clutch release ramp rate.

10. The transmission control module of claim 1, wherein the plurality of instructions further cause the control circuit to:
compare the brake signal to a brake high threshold;
compare the throttle signal to a throttle low threshold;
increment a clutch hold timer in response to (i) the brake signal being less than the brake high threshold and (ii) the throttle signal being less than the throttle low threshold;
compare the clutch hold timer to a timer threshold; and
perform one of the following:
set the clutch release ramp rate to the low ramp rate in response to the clutch hold timer being greater than the timer threshold, and
maintain the clutch hold pressure at a current clutch hold pressure in response to the clutch hold timer being less than the timer threshold.

11. A method for controlling an automatic transmission of a vehicle, the method comprising:
receiving, by a transmission control module and from a transmission output sensor, a transmission output speed signal indicative of a rotational output speed of the automatic transmission;
receiving, by the transmission control module and from an engine throttle sensor, a throttle signal indicative of application of a throttle of the vehicle;
receiving, by the transmission control module and from a brake pressure sensor, a brake signal indicative of application of a brake of the vehicle;
applying, by the transmission control module, a clutch hold pressure to at least one clutch of the automatic transmission as a function of (i) the transmission output speed signal, (ii) the throttle signal, and (iii) the brake signal, the clutch hold pressure having a magnitude sufficient to lock an output shaft of the automatic transmission to resist roll-back of the vehicle;
comparing, by the transmission control module, the brake signal to a brake high threshold;
comparing, by the transmission control module, the throttle signal to a throttle high threshold and a throttle medium threshold;
setting, by the transmission control module, a clutch release ramp rate to a high ramp rate in response to (i) the brake signal being less than the brake high threshold and (ii) the throttle signal being greater than the throttle medium threshold and less than the throttle high threshold; and
adjusting, by the transmission control module, the clutch hold pressure as a function of the current clutch hold pressure and the clutch release ramp rate.

12. The method of claim 11, further comprising:
comparing, by the transmission control module, the transmission output speed signal to an output speed threshold;
comparing, by the transmission control module, the throttle signal to a throttle low threshold;
comparing, by the transmission control module, the brake signal to a brake low threshold; and
releasing, by the transmission control module, the clutch hold pressure in response to (i) the output speed signal being greater than the output speed threshold, (ii) the throttle signal being greater than the throttle low threshold; and (iii) the brake signal being less than the brake low threshold.

13. The method of claim 11, further comprising releasing, by the transmission control module, the clutch hold pressure in response to determining that the automatic transmission has been disengaged from a forward or a reverse gear.

14. The method of claim 11, wherein applying the clutch hold pressure comprises:
comparing, by the transmission control module, the brake signal to a brake high threshold;
comparing, by the transmission control module, the throttle signal to a throttle high threshold; and
applying, by the transmission control module, the clutch hold pressure in response to (i) the brake signal being greater than the brake high threshold and (ii) the throttle signal being less than the throttle high threshold.

15. The method of claim 11, further comprising:
comparing, by the transmission control module, the brake signal to a brake high threshold;
comparing, by the transmission control module, the throttle signal to a throttle high threshold; and
releasing, by the transmission control module, the clutch hold pressure in response to (i) the brake signal being greater than the brake high threshold and (ii) the throttle signal being greater than the throttle high threshold.

16. The method of claim 11, wherein adjusting, by the transmission control module, the clutch hold pressure comprises setting the clutch hold pressure to the product of the current clutch hold pressure and the clutch release ramp rate.

17. The method of claim 11, further comprising:
comparing, by the transmission control module, the throttle signal to a throttle low threshold; and
setting, by the transmission control module, the clutch release ramp rate to a low ramp rate in response to (i) the brake signal being less than the brake high threshold and (ii) the throttle signal being greater than the throttle low threshold and less than the throttle medium threshold.

18. The method of claim 17, further comprising:
incrementing, by the transmission control module, a clutch hold timer in response to (i) the brake signal being less than the brake high threshold and (ii) the throttle signal being less than the throttle low threshold;
comparing, by the transmission control module, the clutch hold timer to a timer threshold; and
performing, by the transmission control module, one of the following:
setting the clutch release ramp rate to the low ramp rate in response to the clutch hold timer being greater than the timer threshold, and
maintaining the clutch hold pressure at a current clutch hold pressure in response to the clutch hold timer being less than the timer threshold.

19. The method of claim 11, further comprising:
comparing, by the transmission control module, the brake signal to a brake high threshold;
comparing, by the transmission control module, the throttle signal to a throttle low threshold and a throttle medium threshold;
setting, by the transmission control module, a clutch release ramp rate to a low ramp rate in response to (i) the brake signal being less than the brake high threshold and (ii) the throttle signal being greater than the throttle low threshold and less than the throttle medium threshold; and
adjusting, by the transmission control module, the clutch hold pressure as a function of the current clutch hold pressure and the clutch release ramp rate.

20. The method of claim 11, further comprising:
comparing, by the transmission control module, the brake signal to a brake high threshold;
comparing, by the transmission control module, the throttle signal to a throttle low threshold;
incrementing, by the transmission control module, a clutch hold timer in response to (i) the brake signal being less than the brake high threshold and (ii) the throttle signal being less than the throttle low threshold;
comparing, by the transmission control module, the clutch hold timer to a timer threshold; and
performing, by the transmission control module, one of the following:
setting the clutch release ramp rate to the low ramp rate in response to the clutch hold timer being greater than the timer threshold, and
maintaining the clutch hold pressure at a current clutch hold pressure in response to the clutch hold timer being less than the timer threshold.

21. A system for controlling an automatic transmission of a vehicle, the system comprising:
a transmission output speed sensor coupled to the automatic transmission and configured to generate a transmission output speed signal indicative of a rotational output speed of the automatic transmission;
a throttle sensor configured to generate a throttle signal indicative of application of a throttle of the vehicle;
a brake sensor configured to generate a brake signal indicative of application of a brake of the vehicle; and
a transmission control module configured to generate a clutch control signal to cause application of a clutch hold pressure to at least one clutch of the automatic transmission as a function of (i) the transmission output speed signal, (ii) the throttle signal, and (ii) the brake signal, the clutch hold pressure having a magnitude sufficient to lock an output shaft of the automatic transmission to resist roll-back of the vehicle,
wherein the transmission control module is further configured to:
compare the brake signal to a brake high threshold,
compare the throttle signal to a throttle high threshold and a throttle medium threshold,
set a clutch release ramp rate to a high ramp rate in response to (i) the brake signal being less than the brake high threshold and (ii) the throttle signal being greater than the throttle medium threshold and less than the throttle high threshold; and
generate a clutch control signal to adjust the clutch hold pressure as a function of the current clutch hold pressure and the clutch release ramp rate.

22. The system of claim 21, wherein the transmission control module is configured to:
compare the transmission output speed signal to an output speed threshold;
compare the throttle signal to a throttle low threshold;
compare the brake signal to a brake low threshold; and
generate a clutch control signal to release the clutch hold pressure in response to (i) the output speed signal being greater than the output speed threshold, (ii) the throttle signal being greater than the throttle low threshold; and (iii) the brake signal being less than the brake low threshold.

23. The system of claim 21, wherein the transmission control module is configured to:
compare the brake signal to a brake high threshold;
compare the throttle signal to a throttle high threshold; and generate the clutch control signal to cause application of a clutch hold pressure in response to (i) the brake signal being greater than the brake high threshold and (ii) the throttle signal being less than the throttle high threshold.

24. The system of claim 21, wherein the transmission control module is configured to:
compare the brake signal to a brake high threshold;
compare the throttle signal to a throttle high threshold; and
generate a clutch control signal to release the clutch hold pressure in response to (i) the brake signal being greater than the brake high threshold and (ii) the throttle signal being greater than the throttle high threshold.

25. The system of claim 21, wherein the transmission control module is configured to:
compare the throttle signal to a throttle low threshold; and
set the clutch release ramp rate to a low ramp rate in response to (i) the brake signal being less than the brake high threshold and (ii) the throttle signal being greater than the throttle low threshold and less than the throttle medium threshold.

26. The system of claim 25, wherein the transmission control module is configured to:
increment a clutch hold timer in response to (i) the brake signal being less than the brake high threshold and (ii) the throttle signal being less than the throttle low threshold;
compare the clutch hold timer to a timer threshold; and
perform one of the following:
set the clutch release ramp rate to the low ramp rate in response to the clutch hold timer being greater than the timer threshold, and
maintain the clutch hold pressure at a current clutch hold pressure in response to the clutch hold timer being less than the timer threshold.

* * * * *